Jan. 27, 1970   J. M. STOPA   3,491,537
GAS TURBINE ENGINE WITH ROTARY REGENERATOR
Filed June 3, 1968
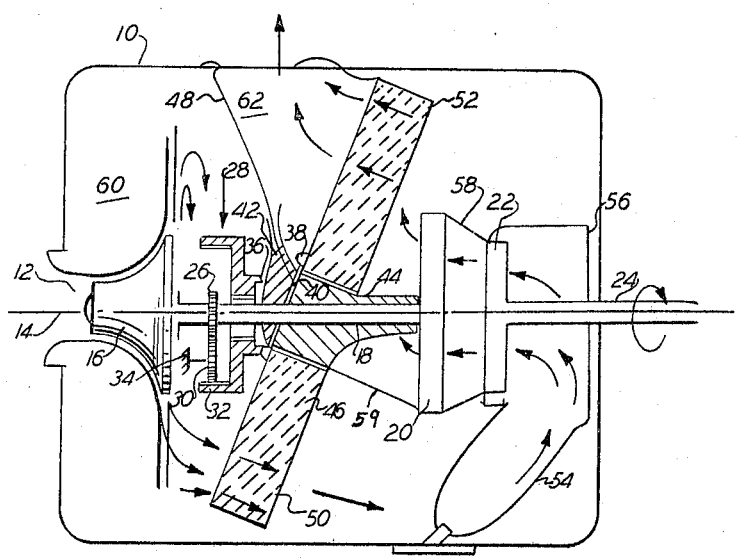
JOHN M. STOPA
INVENTOR.
BY John R. Faulkner
Glenn S. Arendsen
ATTORNEYS 3,491,537
GAS TURBINE ENGINE WITH ROTARY
REGENERATOR
John M. Stopa, Plymouth, Mich., assignor to Ford Motor
Company, Dearborn, Mich., a corporation of Delaware
Filed June 3, 1968, Ser. No. 733,874
Int. Cl. F02g 5/02; F02c 7/10; F23l 15/02
U.S. Cl. 60—39.51                                3 Claims

ABSTRACT OF THE DISCLOSURE

A disc-type regenerator is mounted between the air compressor and the air compressor turbine wheel and is driven from the shaft connecting the compressor and the turbine wheel by a gear arrangement. Relatively cool air from the compressor flows over the gears and assists in maintaining the gears at a temperature conducive to long life. The regenerator can be mounted so its rotational axis is at an angle to the rotational axis of the air compressor and turbine wheel, and the combustion chamber then is located along the larger remaining wall of the housing. Air from the compressor passes through one sector of the regenerator on its way to the combustion chamber. Combustion gases leaving the combustion chamber pass first through the power turbine, then through the compressor turbine and finally through another sector of the regenerator. Regenerator rotation transfers heat from the combustion gases to the air entering the combustion chamber in the conventional manner.

SUMMARY OF THE INVENTION

Regenerative-type gas turbine engines of the prior art generally have had the regenerator mounted remote from the axis of the turbine wheels and rotating about an axis perpendicular to the turbine wheel axis. This invention provides a gas turbine engine in which the regenerator is mounted between the air compressor and the compressor turbine wheel and is driven from the shaft connecting the compressor turbine wheel to the compressor by a gearset. The regenerator preferably is of the disc type and can be mounted so its rotational axis is angled acutely relative to the rotational axis of the air compressor and compressor turbine to permit adequate space for mounting the combustion chamber. Air from the compressor flows over the gearset driving the regenerator disc and then passes through one sector of the regenerator disc on its way to the combustion chamber. Hot gases from the combustion chamber pass initially through the power turbine then through the compressor turbine and finally through another sector of the regenerator. Regenerator rotation thansfers heat from the hot gases leaving the turbines to the incoming air leaving the compressor in the conventional manner. This arrangement cools the regenerator drive gears and provides an extremely compact gas turbine engine capable of high power-to-weight ratio.

BRIEF DESCRIPTION OF THE DRAWING

The drawing presents an elevation view of a gas turbine engine of this invention having the disc-type regenerator mounted at an acute angle to the rotational axis of the gas generator section.

DETAILED DESCRIPTION

Referring to the drawing, the engine of this invention comprises an essentially cylindrical housing 10 having an air inlet 12 located approximately on the housing axis 14. A centrifugal compressor 16 is mounted in air inlet 12 and is connected by a shaft 18 to a compressor turbine wheel 20. Compressor 16 and wheel 20 make up the gas generator section of the engine. Just rearward of turbine wheel 20 is a power turbine wheel 22 connected to a power output shaft 24. The rotational axes of compressor 16 and turbine wheels 20 and 22 lie approximately on housing axis 14.

The sun gear 26 of a gearset represented generally by numeral 28 is fastened to shaft 18 just behind compressor 16 and meshes with planet gears 30 which in turn mesh with a ring gear 32. The cage of planet gears 30 is rigidly fastened to housing 10 as indicated by the ground symbol 34. Ring gear 32 is cup shaped and has gear teeth meshing with the planet gears 30 formed on the inner surface of the cup portion.

The base of ring gear 32 faces rearward and has gear teeth 36 formed thereon with the crests of the teeth angled outward and forward. Teeth 36 mesh with corresponding teeth 38 formed on a flat plate 40 sliding on a boss 42 rigidly fastened to housing 10 and positioned between gear 32 and plate 40. The rearward surface of boss 42 is angled relative to the rotational axis of shaft 18.

A bearing member 44, which is fastened to housing 10, is mounted behind plate 40 and has its forward surface angled at the same angle as the rearward surface of boss 42. Shaft 18 passes through bearing member 44 and is supported therein by appropriate bearings (not shown). The forward portion of bearing member 44 is cylindrical in shape with plate 40 sliding on one diametrical face thereof. A regenerator core 46 is rotatably mounted on the cylindrical surface of the cylindrical portion of bearing member 44 and is fastened to plate 40. Appropriate sliding seals (not shown) divide core 46 into a lower sector 50 and an upper sector 52. A baffle 48 directs compressed air from compressor 16 through the lower sector 50 and also directs exhaust gases leaving upper sector 52 out the exhaust exit.

Behind lower sector 50, a combustion chamber 54 angles rearward and toward the axis 14 of the housing. A baffle 56 directs the hot gases leaving combustion chamber 54 onto the rearward surface of power turbine wheel 22, and a baffle 58 contains the hot gases leaving the forward surface of power turbine wheel 22 and directs the gases into the rearward surface of compressor turbine 20. An additional baffle 59 directs gases leaving compressor turbine wheel 20 into the upper sector 52 of the regenerator core.

In operation, compressor 16 draws air through air inlet 12 and produces compressed air in the forward chamber 60. Chamber 60 of course contains an appropriate diffuser (not shown). The compressed air from chamber 60 flows over the gearset 28 and passes into the forward face of lower sector 50 of regenerator core 46. Air leaving lower sector 50 enters combustion chamber 54 where it is burned with an appropriate fuel. Hot gases leaving combustion chamber 54 are directed into the power turbine wheel 22 and then into the compressor turbine wheel 20. The baffling directs air leaving the compressor turbine wheel 20 into the upper sector 52 of regenerator core 46 and then into an exhaust passage 62.

Upper sector 52 moves heat from the exhaust gases and transfers the heat to the air passing through the lower sector 50 in the conventional manner.

Housing 10 can be of any desired shape but is preferably cylindrical. The rotational axis 14 can be located away from the approximate center of the housing to provide additional space for the combustion chamber and for accessory systems such as fuel pumps, electric generators, etc. Regenerator 46 can be located in a plane perpendicular to rotational axis 14 although tilting the core at an angle of about 5–30 degrees as shown increases core size and provides space for the combustion chamber without increasing the size of the housing.

What is claimed is:
1. A gas turbine engine comprising
   a housing,
   a gas generator section mounted in said housing and including an air compressor connected to a compressor turbine wheel by a shaft,
   a combustion chamber,
   a disc type rotary heat exchanger mounted within said housing between said compressor and said compressor turbine wheel, said heat exchanger separating substantially the entire interior of said housing into a forward portion containing said compressor and a rearward portion containing said compressor turbine wheel and said combustion chamber, said heat exchanger having gear teeth fastened to the side facing said compressor, and
   a gearset located between said heat exchanger and said compressor, said gearset including a driving gear connected to the compressor turbine wheel between said air compressor and said heat exchanger, and a driven gear meshing with said driving gear, said driven gear having gear teeth meshing with the gear teeth fastened to the heat exchanger so said heat exchanger is driven from said compressor turbine wheel, said gearset being located in at least a portion of the relatively cool gases leaving said compressor before said gases enter said heat exchanger.
2. The engine of claim 1 in which the rotational axis of the heat exchanger is angled relative to the rotational axis of the air compressor and turbine.
3. The engine of claim 1 in which the relatively cool gases leaving the compressor pass through the sector of the regenerator on one side of said shaft and relatively warm gases leaving the turbine wheel pass through the sector of the regenerator on the other side of said shaft, said combustion chamber being located on the same side of the axis of said shaft as the sector of the heat exchanger through which the relatively cool gases pass.

References Cited

UNITED STATES PATENTS

| | | |
|---|---|---|
| 2,960,825 | 11/1960 | Sampietro et al. |
| 3,083,762 | 4/1963 | Kolthoff et al. _____ 165—8 |
| 3,177,661 | 4/1965 | Hasbrouck et al. ____ 60—39.51 |
| 3,362,157 | 1/1968 | Taylor. |
| 3,367,403 | 2/1968 | Sawyer et al. _____ 165—7 |

FOREIGN PATENTS 883,530  11/1961  Great Britain.

MARK M. NEWMAN, Primary Examiner

A. D. HERRMANN, Assistant Examiner

U.S. Cl. X.R.

165—8